Patented Nov. 7, 1922.

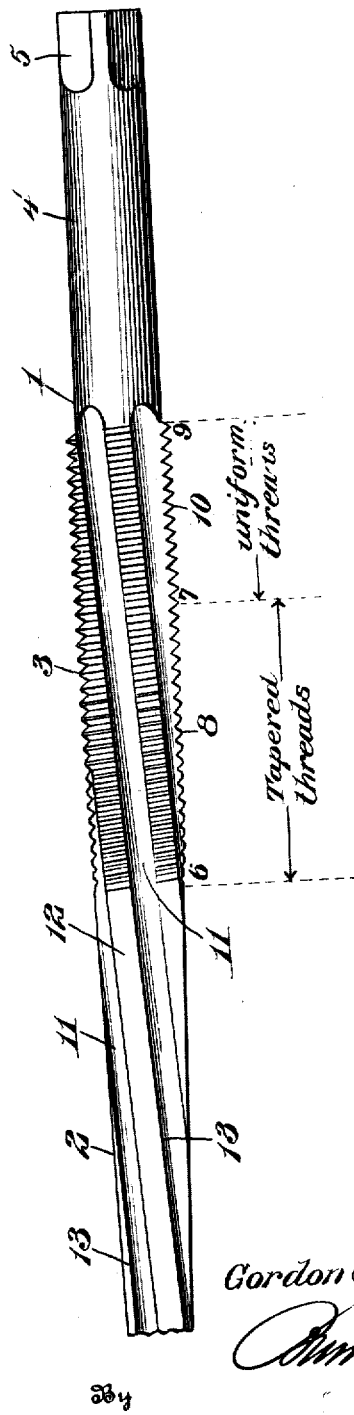

1,434,870

UNITED STATES PATENT OFFICE.

GORDON M. BRUBAKER, JR., OF MILLERSBURG, PENNSYLVANIA, ASSIGNOR TO W. L. BRUBAKER & BROS. COMPANY, OF MILLERSBURG, PENNSYLVANIA, A CORPORATION.

STAY-BOLT TAP.

Application filed January 8, 1920. Serial No. 350,074.

*To all whom it may concern:*

Be it known that I, GORDON MARK BRUBAKER, Jr., a citizen of the United States, residing at Millersburg, in the county of Dauphin and State of Pennsylvania, have invented new and useful Improvements in Stay-Bolt Taps, of which the following is a specification.

My invention relates to staybolt taps, and its object is to provide a staybolt tap with spiral flutes or grooves so arranged and cooperating with the reaming cutting edges and tapered and straight thread-cutting and thread-finishing portions of the tapered shank of the tool as to secure certain novel and efficient actions and desirable advantages, to wit,—first, to make the tap cut easier in order to give it more revolutions per minute, thus reducing the time required to tap holes; second, to throw the chips out of the hole and lessen the chance of corrupting the threads; third, to enable accurate holes to be tapped in less time and with less wear and tear on the threads than with taps of ordinary construction; and, fourth, to reduce the jerking of the tap which is so often the cause of the threads breaking.

I attain these objects by the construction shown in the accompanying drawing, in which the figure shown is a view in side elevation of a staybolt tap embodying my invention.

Referring to the drawing, 1 designates the shank of the tool which comprises the forward reamer portion 2, the intermediate tap portion 3, and the rear tang portion 4, said tang portion having the usual angular end 5 by means of which it may be turned. As shown, the tap portion 3 has two threaded surfaces, to wit, a forward thread cutting surface extending between the points 6 and 7 and composed of tapered threads 8, and a rear thread finishing surface extending between the points 7 and 9 and composed of uniform threads 10, said threaded surfaces intersecting at the point 7. Also, as shown, the reamer portion 2 extends from the extreme forward end of the tool, which in the drawing is broken away, to the point 6. The reamer porton and threaded surfaces of the tap portion are thus without separation or break, or, in other words, are continuous with each other.

The shank is formed with longitudinal flutes or grooves 11 producing the spiral ribs 12 on which the threads 8 and 10 are formed. The edges 13 of these ribs also form the reaming cutters. As shown, the grooves 11 extend the full distance from the forward end of the shank to the point of intersection 9 between the working portion of the shank and the tang 4, the grooves thus providing clearance channels for the reception and discharge of the chips from both the reaming and the thread cutters. The essence of my invention consists in extending these grooves spirally, instead of making them straight and parallel, as in staybolt taps of ordinary construction. By this means I obtain the following advantages: First, the reaming edges 13, being arranged to cut on a spiral line, not only facilitate the cut, but cut with greater ease and smoothness. Furthermore, by extending them at an angle to the axis of the shank, the cutting edges are arranged for a shear-cutting action and are more firmly backed by the ribs in the direction of the line of cut, and hence the cut may be made with greater rapidity and with less liability of the cutting edges forming fins or ragged cuts and causing undue friction and heating, or of the cutting edges binding or hanging and causing the shank to snap, a fault common with ordinary staybolt taps having straight parallel grooves. Secondly, the spiral flutes and ribs dispose the threads 8 and 10 at an angle, with similar advantages in more freely and easily cutting and finishing the threads and discharging the shavings into the clearance grooves. At the same time the threads 8, by being arranged at an angle, not only begin the work of forming the threads but also divide up the coarser chips formed by the reaming cutters, thus allowing the threads to cut with less resistance and liability of injury and to do smoother and better work. This also avoids the necessity of cross-grooving the ribs of the reaming portion in order to divide the chips formed by the cutting edges thereof, so that it is not necessary to weaken the tool at the point mentioned where it is subject to great strain. Thirdly, the spiral formation of the grooves and ribs causes the chips to be separated and thrown into the grooves, thus reducing friction, wear and tear upon the cutting and threading surfaces, and the tendency of the tool to choke and hang in the bore with disastrous results.

It will be observed that the surfaces 2 and 8 extend on a continuous (continuously uniform) taper from the forward end of the reamer to the point 7, where the tapered threads 8 intersect the uniform threads, and that the threads 8 begin directly at the point of termination of the reamer, while the first thread of surface 10 is a continuation of the final thread of surface 8, said threads intersecting at the point where the tapered portion of the tool merges into the portion of uniform diameter on which threads 10 are formed. By this construction the tool has a continuous chip-breaking action throughout the lengths of the reaming and tapping portions, also a continuous clearance action, and each working surface comes into action immediately upon the cessation of action of the preceding surface, so that in the finished product it is impossible to tell where one acting surface has left off cutting and the succeeding acting surface began cutting. This avoids liability of the tool hanging in the bores and damaging the work, and reduces liability of breakage of the tool, prevents the tool from canting and getting out of line and cutting crookedly, and insures the production of perfectly finished work. Hence the tool is particularly valuable for use in reaming and tapping staybolt holes in two spaced boiler sheets at a time, as a perfect lead and centering action is obtained, insuring the boring of true and absolutely alined holes without irregularity of action liable to cause vibration of a loose sheet or the tool, the cutting of irregularly shaped holes due to such vibration, or the binding or the breakage of the tool due to irregular alinements or vibratory motions.

It will, therefore, be readily understood that I obtain the objects and advantages set forth in a simple and efficient manner and produce a tool which is more reliable, rapid and efficient in action and much less liable to break than staybolt taps of ordinary construction, a very desirable advantage in view of the general structural weaknesses of long and slender tools of this character.

Having thus fully described my invention, I claim:

As a new and improved article of manufacture, a stay bolt tap comprising a shank having a forward tapered reaming portion, a rear tang portion, and an intermediate tap portion, said tap portion having a forward threading surface continuous with said reaming portion and composed of tapered threads of succesively and progressively increasing diameter constituting a uniform continuation of the taper of the reaming portion and a rear threading surface composed of threads of like diameter continuous with and corresponding in diameter to the final thread of largest diameter of said tapered threads, the said shank being provided with spiral clearance grooves extending continuously between the tip of the reaming portion and the tang, said grooves producing spiral ribs having shear-cut reaming edges and on which said threading surfaces are formed, the threads of said surfaces extending across the ribs at an angle to the axis of the tool.

In testimony whereo I affix my signature.

GORDON M. BRUBAKER, J_R.